Dec. 30, 1930.    O. A. LABUS    1,787,317
STUFFING BOX
Filed Oct. 23, 1926
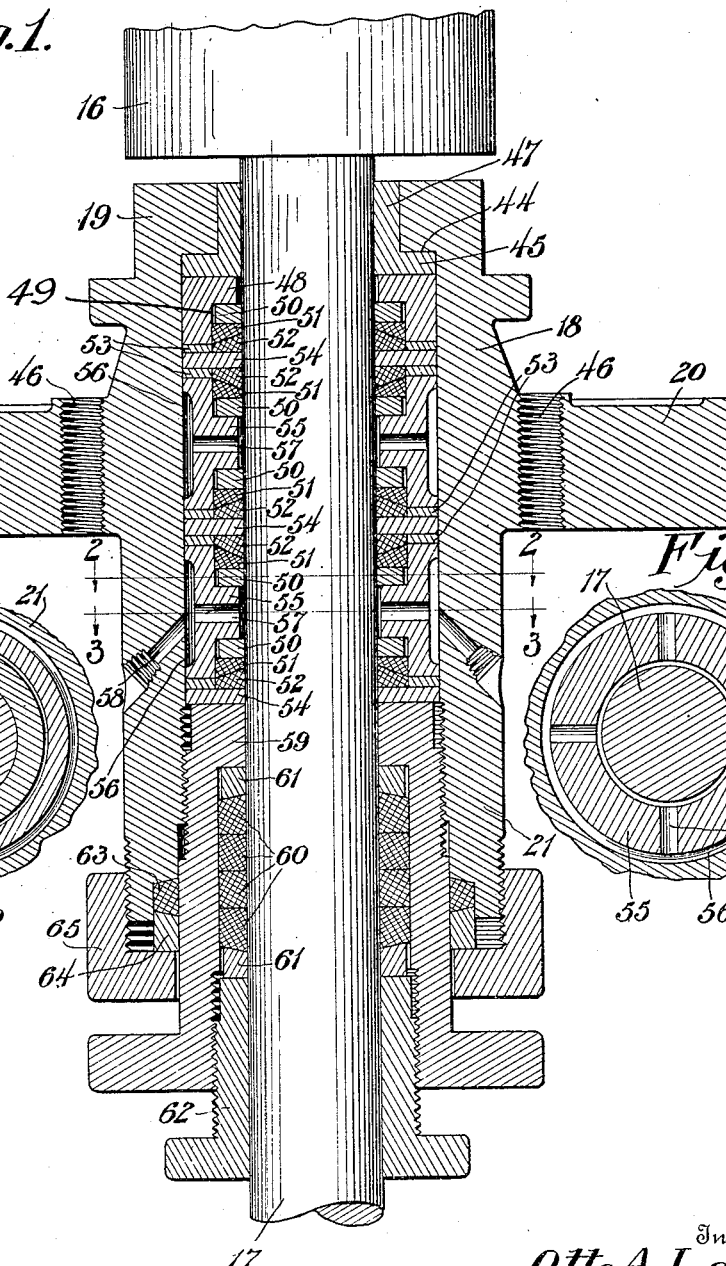
Witnesses
C. L. McDonald
E. N. Lovewell
Inventor
Otto A. Labus
By
C. G. Siggers
Attorney Patented Dec. 30, 1930

1,787,317

UNITED STATES PATENT OFFICE

OTTO A. LABUS, OF WISCONSIN RAPIDS, WISCONSIN, ASSIGNOR, BY MESNE ASSIGNMENTS, TO NATIONAL CARBONIC MACHINERY COMPANY, OF WISCONSIN RAPIDS, WISCONSIN, A CORPORATION OF WISCONSIN

STUFFING BOX

Application filed October 23, 1926. Serial No. 143,687.

This invention relates to a stuffing box which has many features of general application, but has been devised especially with reference to its use in connection with a piston rod of a fluid or gas compressor.

One object of the invention herein claimed is to provide a stuffing box with a series of packing, pressure and separator rings, so arranged as to form a connection between the end of the cylinder and the piston rod, which will permit the latter to reciprocate, but will not permit any leakage of the gas or liquid contained within the cylinder.

In the drawing:

Figure 1 is a section taken longitudinally of the stuffing box.

Figure 2 is a section taken on the line 2—2 of Figure 1.

Figure 3 is a section taken on the line 3—3 of Figure 1.

The stuffing box, shown in the drawings, comprises a substantially cylindrical housing 18, having a peripheral flange 20 adapted to be bolted to the end of the cylinder. The housing 18 has a reduced inwardly extending portion 19 adapted to form the end of the cylinder, and also has a portion 21 which extends outwardly from the flange 20. The stuffing box housing is adapted to receive centrally thereof a reciprocable piston rod 17, which has a piston head 16 rigidly secured to the inner end thereof. A bushing 47 fits around the piston rod 17 within the inner portion 19 of the stuffing box housing, and is formed with a head 45, which seats against a shoulder 44 within the housing.

The stuffing box packing is shown as being composed of a series of metal rings, packing rings and separators arranged successively, and repeated as illustrated in Figure 1. Starting with the upper or inner end of the stuffing box, immediately adjacent to the head 45 of the bushing, there is a metal ring 48, which is provided internally with a counterbore 49, in which there is inserted a Babbitt or bronze floating ring 50. The ring 48 is fitted snugly to the inside bore of the housing 18, but is fitted loosely with a clearance around the piston rod 17, whereas the floating ring 50 has a perfect sliding fit on the piston rod, but is fitted loosely with a clearance adjacent the side of the channel 49 in the ring 48. Following the floating ring 50, there are two rings 51 and 52 composed of suitable material, such as Babbitt ribbon mixed with flakes of graphite, or lead shreds mixed with graphite. These rings 51 and 52 have adjacent inclined faces. Surrounding the ring 52, adjacent the ring 48, there is fitted a leather washer 53, constituting an equalizing or expansion ring.

The position of the leather expansion ring 53 is of importance, and it will be noted that the leather does not come in contact with the piston rod. Such contact would be undesirable, because at times the piston rod 17 becomes heated, and would burn or char the leather.

Following the rings 52 and 53, there is a metal separator 54, after which the rings 53, 52, 51 and 50 are repeated, the latter fitting into one side of a counterbored double lantern 55, which has a peripheral channel 56 and radial holes 57 to act as a gas and oil collecting chamber. This arrangement is followed by another series of packing rings and a second lantern 55, whose peripheral channel 56 is in communication with ports 58 through the stuffing box housing, so that oil may be forced to circulate through the stuffing box. The leather rings 53 serve to control the compression, as well as the expansion of the packing, and also allow for lateral expansion of the entire group of packing. While rubber has been sometimes employed for this purpose, leather is particularly advantageous, since the oil which is used to lubricate the piston rod is destructive to rubber.

Below the lowermost separator 54 is a packing gland 59, which is hollowed out to receive a series of soft packing rings 60, which are placed between two metal packing rings 61. The packing rings 60 are adjusted by means of a packing gland 62 inserted within the end of the gland 59. The gland 59 is also surrounded by a soft packing ring 63, placed within the end of the stuffing box 18, and adjusted by means of a metal ring 64 and a gland 65 which engages the end of the stuffing box. Thus, it will be seen that in addition to the packing between the stuffing box and piston rod, the gland which adjusts this packing is itself provided with packing, both inside and outside.

The flange 20 is adapted to seat directly against the end of the cylinder, and a packing gland may be inserted between the inner portion of the stuffing box housing and the end portion of the cylinder, and may be adjusted by means of screws inserted in holes 46 tapped in the flange 20. The stuffing box housing is formed as an integral part of the cylinder head, so that the cylinder head and stuffing box may be removed bodily to inspect the interior of the cylinder, and when replaced will be in perfect alinement, since its alinement is not dependent upon the condition or adjustment of the packing between the cylinder head and the cylinder.

The arrangement of the various packing rings within the stuffing box insures a gastight connection between the piston rod and the head of the cylinder, and, of course, need not be disarranged when the cylinder head is removed or replaced.

While I have shown and described in detail one form in which the invention may be embodied, it is to be noted that this construction is subject to considerable modification without any material departure from the salient features of the invention as defined in the claims.

What is claimed is:

1. A stuffing box for piston rods, comprising a substantially cylindrical housing having a peripheral flange adapted to be secured directly to the end of a cylinder and a reduced portion extending inwardly to form the head of the cylinder, a bushing seated within said reduced portion, a metallic ring following the bushing and fitting closely within the housing but affording a clearance for the piston rod, said ring being counterbored at its inner edge, a floating ring fitting closely around the piston rod within the counterbore with a clearance between the outer edge of the floating ring and the counterbored ring, packing rings following the counterbored ring and floating ring, a separator ring following the packing rings, other packing elements following the separator ring and including a double-counterbored lantern ring with packing rings in front of and behind the same, and a gland at the outer end of the housing for adjusting said packing elements.

2. A stuffing box for piston rods, comprising a substantially cylindrical housing, a metallic ring fitting closely within the housing but affording a clearance for the piston rod, said ring being counterbored at its inner edge, a floating ring fitting closely around the piston rod within the counterbore with a clearance between the outer edge of the floating ring and the counterbored ring, packing rings following the floating ring and extending beyond the end of the counterbored ring; an expansion ring abutting the end of the counterbored ring and located between the periphery of the extended packing and the wall of the housing; a metal separator ring abutting the face of the extended packing and the expansion ring and extending between the piston rod and the wall of the housing and means following the separator ring for exerting pressure on the packing.

3. A stuffing box for piston rods comprising a substantially cylindrical housing; a metallic ring fitting closely within the housing but spaced slightly from the rod, said ring being counterbored at its inner end; a floating ring closely fitting the piston within the counterbore, with a clearance between its peripheral face and the counterbore; a pair of packing rings following the floating ring and having adjacent inclined faces; one of said rings abutting the floating ring in the counterbore and the other extending beyond the inner end of the counterbored ring with a space between its peripheral face and the housing; an expansion ring in said space and abutting the inner end of the counterbored ring; a separator ring following the last packing ring and the expansion ring and abutting their inner faces, said ring extending between the rod and the wall of the housing, other packing elements following the separator ring and including a double counterbored lantern ring with packing rings in front of and behind the same; and a gland for adjusting said packing elements.

In testimony, that I claim the foregoing as my own, I have hereto affixed my signature.

OTTO A. LABUS.